Jan. 22, 1952 F. H. TAYLOR 2,583,027

TUNING SYSTEM FOR COAXIAL CAVITY RESONATORS

Filed Jan. 11, 1945 3 Sheets-Sheet 1

Inventor

FRANK HOWARD TAYLOR

By Edward D. Phinney

Attorney

Jan. 22, 1952 F. H. TAYLOR 2,583,027

TUNING SYSTEM FOR COAXIAL CAVITY RESONATORS

Filed Jan. 11, 1945 3 Sheets-Sheet 2

Inventor
FRANK HOWARD TAYLOR
By Edward D. Phinney
Attorney

Jan. 22, 1952 F. H. TAYLOR 2,583,027

TUNING SYSTEM FOR COAXIAL CAVITY RESONATORS

Filed Jan. 11, 1945 3 Sheets-Sheet 3

Inventor
FRANK HOWARD TAYLOR
By
Edward D. Phinney
Attorney

Patented Jan. 22, 1952 2,583,027

UNITED STATES PATENT OFFICE 2,583,027

TUNING SYSTEM FOR COAXIAL CAVITY RESONATORS

Frank Howard Taylor, London, England, assignor, by mesne assignments, to International Standard Electric Corporation, New York, N. Y., a corporation of Delaware Application January 11, 1945, Serial No. 572,375
In Great Britain January 12, 1944

3 Claims. (Cl. 178—44)

The present invention relates to ultra high frequency electric oscillation generators, and concerns particularly an oscillator provided with means for frequency modulating the generated wave.

An oscillator of this kind is suitable for use in some types of altimeter apparatus but is not necessarily restricted to such an application.

The principal object of the invention is to provide a completely screened, compact, and reliable oscillator capable of operating over long periods without appreciable variation in performance.

According to the invention, there is provided an electric oscillation generator for ultra high frequencies comprising a thermionic valve having a cathode, a control grid, and an anode, means for maintaining the control grid at ground potential for ultra high frequencies, a feedback connection between the cathode and anode, separate high impedance resonant means connecting the control grid to the anode and to the cathode respectively, and means for periodically varying the resonance frequency of one of the said resonant means.

The invention also provides an electric oscillation generator for ultra high frequencies comprising a thermionic valve having an envelope, and inside the said envelope a cathode, a control grid, an anode, and a condenser connecting the anode and cathode, and comprising also condenser means for connecting the control grid to earth at ultra high frequencies, a first hollow resonator connecting the anode and control grid, a second hollow resonator connecting the cathode and control grid, and means for periodically varying the tuning of the first resonator.

The invention will be described with reference to the accompanying drawings in which.

The oscillator employs a triode valve of the kind intended for operation with the control grid at ground potential, and provided with an internal capacity coupling between the anode and cathode.

Figure 1:
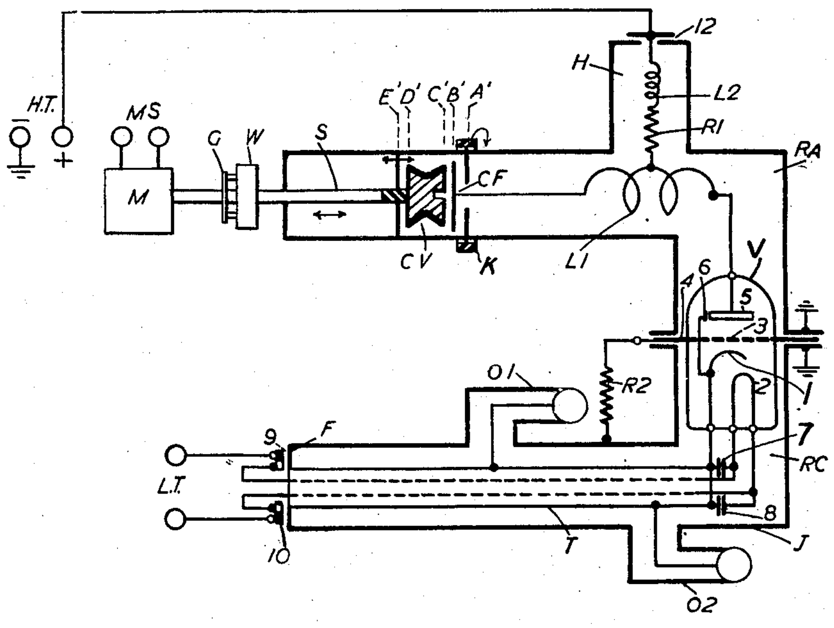
Fig. 1 shows a schematic diagram of an oscillator according to the invention, with details of the operating circuit.

The oscillator is shown in the schematic diagram, Fig. 1. The triode valve V, of the kind mentioned above, comprises a cathode 1 indirectly heated by a filament 2, a control grid 3 connected to an annular terminal disc 4 sealed through the envelope of the valve, and an anode 5. A small plate 6 is arranged close to the anode 5 and is connected through or beside the grid to the cathode, thus forming a capacity connection between the anode and cathode, as explained in the specification referred to above. The frequency of oscillation is determined by the anode resonator RA, which has a low decrement and comprises a co-axial line having a right-angle bend as indicated. The line is approximately half a wave-length long and the central conductor connected to the anode comprises a helix of two or three turns of copper tube to constitute the anode tuning inductance L1. A resonator RC is provided for the cathode and comprises a quarter-wave co-axial line having a right angle bend similar to the anode resonator.

The control grid disc 4 is sandwiched between the flanged ends of the anode and cathode resonators, mica rings or other suitable non-conducting sheet (not shown) being interposed to insulate the disc from both the resonators. In this way there are formed a pair of by-pass condensers for connecting the control grid to the two resonators for the radio frequency waves, according to the usual practice.

The central conductor of the resonator RC comprises a tube T through which the two current leads for the filament 2 are passed. This tube is connected to the outer wall of the resonator by the annular disc F thus closing the end of the resonator. By-pass condensers 7, 8, 9, 10 are provided connecting the filament leads to the tube T at both ends. Condensers 9 and 10 may conveniently be formed by mounting two terminal plates for the leads on the disc F as indicated with an intervening insulating sheet (not shown). These terminal plates are connected to a suitable low tension supply for the filament at LT. The resonator RC has a higher decrement than RA and does not exert much control over the frequency.

The central conductor of the resonator RA is connected to the outer wall at the end remote from the valve V by a condenser system comprising an adjustable fixed portion CF and an adjustable variable portion CV. The arrangement of this system is diagrammatically shown in Fig. 2. The sketches A to E in this figure show the form of condenser vanes fixed at the correspondingly lettered positions A′ to E′ in Fig. 1. At A′ are a pair of quadrant vanes connected to the wall of the resonator and having a clearance hole in the centre. These vanes are fixed to the resonator in such a manner as to allow them to be rotated about the axis of the resonator from outside, by hand, for example by means of an external circumferential ring K rotatable about the tûbe. At B′, spaced slightly apart from A, are a pair of quadrant fixed vanes attached to the central conductor of the resonator, which passes through the clearance hole in the vanes A. At C′ and D′ are two similar and similarly placed pairs of quadrant vanes electrically and mechanically connected together, forming a rotor fixed to, but insulated from, a rotatable shaft S. Finally at E′ are a pair of quadrant vanes fixed to the wall of the resonator, and having a central clearance hole for the shaft S.

This shaft is driven continuously from a motor M (Fig. 1) through a flexible coupling G, an appropriate fly-wheel W being fixed to the shaft. A suitable current source for the motor is intended to be connected to terminals MS.

The vanes A and B constitute the fixed condenser CF, the capacity of which is, however, adjustable for the purpose of tuning the mean resonance frequency of the resonator RA, by rotating the vanes A so as to cover more or less of the area of the vanes B. The variable condenser CV comprises two parts, effectively in series, formed respectively between the vanes B and C, and D and E. The capacity of this condenser continuously fluctuates between two values twice per revolution of the shaft S, as the vanes C and D rotate in front of the vanes B and E. A longitudinal adjustment of the rotor and shaft enables the gap between the vanes B and C to be adjusted, thus adjusting the amplitude of the capacity fluctuation. This adjustment is preferably made in such a manner that the gap between vanes D and E is unaltered. This means that the vanes E should be capable of sliding longitudinally along the tube without rotation. Having set the capacity of the fixed condenser CF to give the desired mean frequency, the amplitude of the frequency variation produced by the motor can be set by the adjustment of CV.

The diameter of the vanes C and D is made slightly smaller than that of the vanes B or E in order that slight lateral wear at the bearings of the shaft S will not appreciably affect the capacity of the condenser CV. Since this condenser is made up of two parts in series, slight longitudinal wear will not have any appreciable effect either, since the two gaps will thereby be changed in opposite directions, so that to a first approximation the capacity of CV will remain unaffected by longitudinal wear.

The rotor unit fixed to the shaft S and comprising the vanes C and D may be conveniently made by taking a relatively thick solid metal disc and by turning on the edge thereof a relatively deep V groove, as indicated in the sectional view seen in Fig. 1, so that the disc assumes the form of a pulley wheel. Diagonally opposite sectors of the disc are then cut away leaving a sufficient central hub, so that the plan view of the disc takes the form shown at C in Fig. 2. The front and back surfaces of the disc so shaped constitute the vanes C and D which are thus mechanically and electrically integral.

The purpose of cutting the groove is to reduce the edge capacity between the rotor and the wall of the resonator, thereby reducing the capacity variation due to wear of the bearings. For a similar reason, a central circular recess may be cut in the C face of the rotor, thereby reducing that part of the capacity to the B vanes which is not affected by the rotation, and reducing variations due to end play of the shaft S.

The high tension supply for the anode of the valve V is connected through a side tube H to a point on the inductance L1 which is at the voltage node of the resonator. Connection is made through an impedance comprising a resistance R1 and a radio frequency choke coil L2. This impedance can be conveniently made by simply inductively winding the resistance R1, preferably on a small cylinder to reduce radiation. A suitable by-pass condenser 12 is provided by means of a plate separated from the end of the side tube by mica or other insulating sheet.

The control grid 3 is connected to the wall of the resonator by a high resistance $R_2$ acting as a grid leak providing negative bias for the grid from the grid current flowing therethrough.

Two side tubes O1 and O2 are provided for the resonator RC, each having a central conductor connected to a point on the tube T. These provide two radio frequency output leads having different output impedances depending on the position of the corresponding connecting point on tube T. Clearly only one or any other number of output leads could be provided as desired.

It may be noted that the impedance terminating the cathode resonator RC is that of the anode resonator RA divided by the amplification constant of the valve V. The output is taken from the cathode resonator because in these circumstances any reflected impedance from the output load will produce a very small amplitude modulation of the oscillations.

The resonators RA and RC are shown with right-angle bends because this produces a compact and convenient arrangement. It is however not essential to make the resonators like this. They could, for example, be simply straight tubes. In the form shown, access to the valve may be easily obtained, for example, by providing a screwed cap (not shown in Fig. 1) at J closing a hole through which the connections to the cathode and its heater may be made and inspected. Other easily removable caps or plates giving access to other parts may clearly be provided where required.

Figure 2:
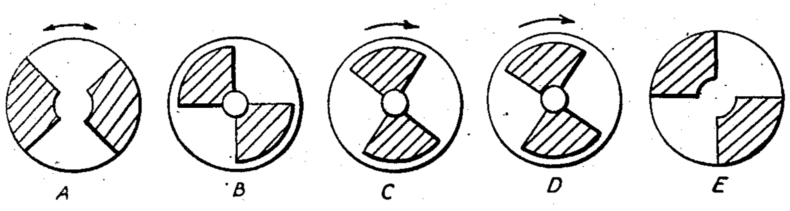
Fig. 2 shows diagrams to illustrate a detail of Fig. 1.

It will be understood that the vane system shown in Fig. 2 may be modified in various ways. For example, by providing two pairs of 45° vanes in each case, the capacity of the condenser CV may be made to fluctuate four times per revolution of the shaft S. The vanes may obviously be shaped in other ways, for example in order to provide a particular kind of capacity variation.

Figure 3:
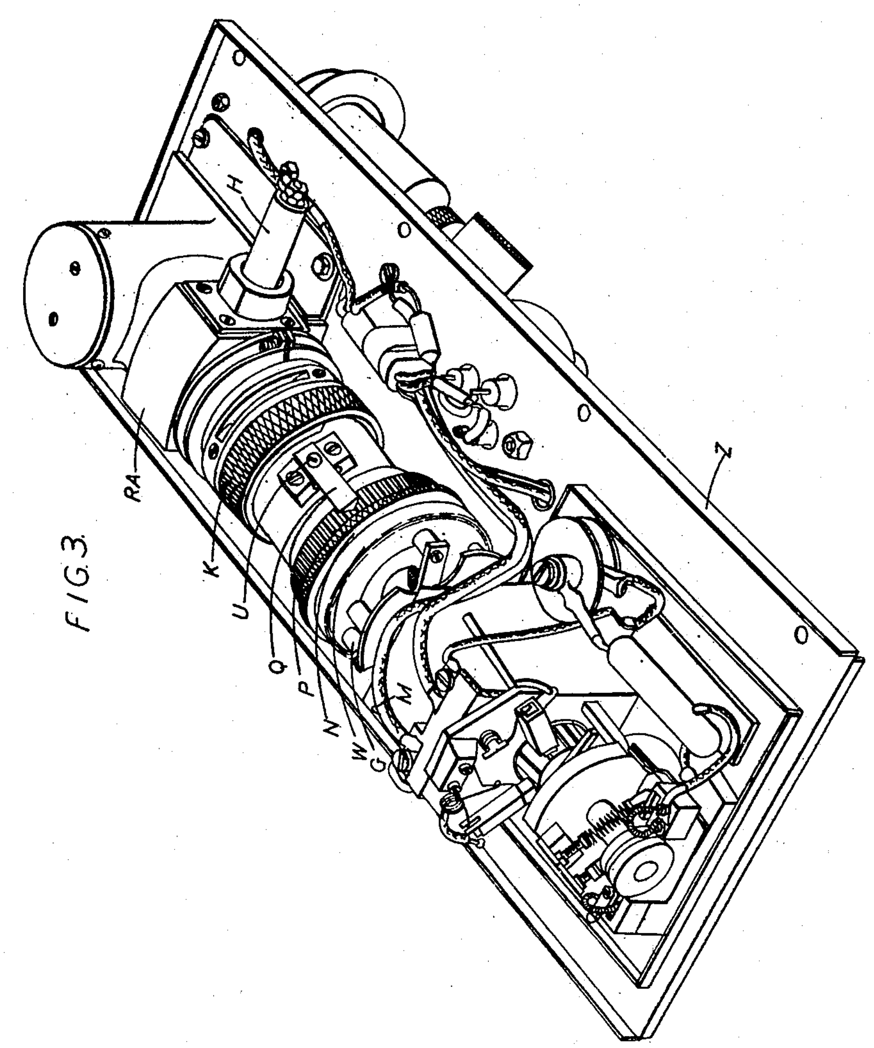
Figs. 3 and 4 show perspective top and bottom views of the oscillator shown diagrammatically in Fig. 1.
Figure 4:
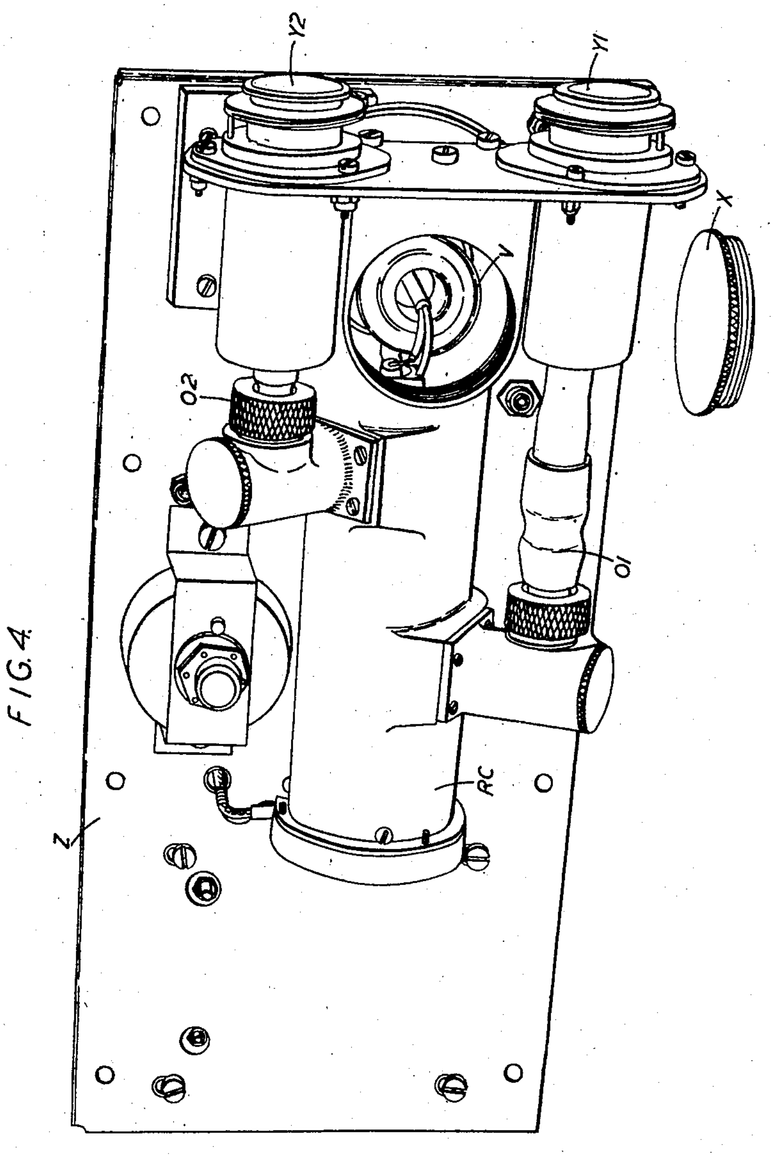

Figs. 3 and 4 show top and bottom perspective views of an oscillator in accordance with the diagram Fig. 1. The elements shown in Fig. 1 which are visible in Figs. 3 and 4 are given the same designations.

It will be seen from these figures that the parts of the oscillator are mounted on opposite sides of a base plate Z. Referring first to Fig. 3, a knurled ring K is provided to adjust the vanes A (Fig. 2). Another knurled ring N adjusts the gap between the vanes B and C by means of a screw system not visible. This ring is provided with a toothed portion P fixed thereto and engaged by a tooth on a tongue Q attached to the wall of the resonator for fixing the adjustment of the ring N. When it is desired to change the setting of the gap between the vanes B and C, the tongue Q is released by loosening the screw U, and this then allows the knurled ring N to be turned. It is then fixed in the new position by retightening the screw U.

Referring to Fig. 4, the valve V is visible through the hole in the resonator RC from which the closing cap X has been removed. The output leads O1 and O2 are shown terminated in suitable radio frequency connecting sockets Y1 and Y2.

In order to give an example of the possibilities of the invention, the following particulars are given of the oscillator illustrated in Figs. 3 and 4:

Mean output frequency, 432.5 megacycles per sec.
Range of adjustment of mean frequency, 12.5 megacycles per sec.
Range of modulation variation from mean, ±12.5 megacycles per sec.
Modulation frequency, 100 or 200 cycles per sec.
Output Power, 3 watts.
Overall efficiency, 32.5%.
Motor speed, 3,000 R. P. M.
Overall Dimensions, 5″ x 4¾″ x 7½″.
Weight, 2½ lbs.

The two alternative modulation frequencies were obtained with the same motor by using one pair or two pairs of condenser vanes in each set. The light weight was obtained by making all parts of aluminium alloy where practicable. The oscillator was found to be very stable in performance, as after having been switched on for ¼ hour, the change in the mean frequency produced by a subsequent rise of 45° C. in the surrounding temperature was only 0.1%, the corresponding change in the frequency variation being only 0.8%.

It will be understood that the above figures are given for illustration only, and do not imply limitation of the invention to any particular range of design values.

What is claimed is:

1. A tuning system for a coaxial cavity resonator having inner and outer conductors comprising a manually adjustable fixed condenser and a continuously variable condenser, said adjustable fixed condenser comprising a metallic plate conductively connected to the outer conductor of said resonator, a second metallic plate parallel to the first mentioned plate and conductively connected to the inner conductor of said resonator, one of said plates being adjustably mounted within said outer conductor for manual rotation about its central transverse axis; said variable condenser comprising a stator metallic plate parallel to said other plates and conductively connected to said outer conductor and spaced from said second plate, said stator plate being mounted for longitudinal movement parallel to its central transverse axis and a conductive member mounted for continuous rotation about its transverse axis arranged between said second and said stator plates, said member having conductive faces parallel to and adjacent said second and said stator plates, said second plate being common to said adjustable and said variable condenser, a rotatable driving shaft extending into said resonator on which shaft said conductive member is mounted for rotation therewith, said shaft being also adjustably mounted for longitudinal movement to adjust the spacing between said conductive member and said second metallic plate.

2. In a tuning system for a coaxial cavity resonator having inner and outer conductors, a variable condenser comprising a metallic plate within said resonator connected to the inner conductor thereof, a stator conductive plate parallel to said metallic plate conductively connected to said outer conductor and spaced from said metallic plate, and a conductive member galvanically insulated from both said plates and mounted for continuous rotation about its transverse axis arranged between said plates, said member having conductive faces parallel to and facing said plates, and a rotatable driving shaft extending into said resonator on which shaft said conductive member is mounted for rotation therewith, said stator plate and said shaft being both mounted for independent longitudinal adjustment movement to adjust the spacing between said conductive member and said metallic plate.

3. An arrangement according to claim 1, wherein said plates and said member each comprise quadrant vanes concentric with said driving shaft.

FRANK HOWARD TAYLOR.

REFERENCES CITED

The following references are of record in the file of this patent:

UNITED STATES PATENTS

| Number | Name | Date |
|---|---|---|
| 1,426,807 | Arnold et al. | Aug. 22, 1922 |
| 1,611,313 | Latraverse | Dec. 21, 1926 |
| 1,664,518 | Lindberg | Apr. 3, 1928 |
| 1,995,175 | Gill | Mar. 19, 1935 |
| 2,034,433 | Heintz | Mar. 17, 1936 |
| 2,052,888 | Lindenblad | Sept. 1, 1936 |
| 2,218,223 | Usselman et al. | Oct. 15, 1940 |
| 2,306,282 | Samuel | Dec. 22, 1942 |
| 2,310,695 | Higgins | Feb. 9, 1943 |
| 2,311,522 | Conron | Feb. 16, 1943 |
| 2,351,744 | Chevigny | June 20, 1944 |
| 2,351,895 | Allerding | June 20, 1944 |
| 2,406,364 | Friis | Aug. 27, 1946 |
| 2,408,355 | Turner | Sept. 24, 1946 |
| 2,416,567 | McArthur | Feb. 25, 1947 |
| 2,423,327 | Hafferty | July 1, 1947 |

FOREIGN PATENTS

| Number | Country | Date |
|---|---|---|
| 556,167 | Great Britain | Sept. 22, 1943 |